(12) United States Patent
Shepherd et al.

(10) Patent No.: US 9,357,013 B2
(45) Date of Patent: May 31, 2016

(54) CLIENT-SIDE SCRIPT TO APPLICATION COMMUNICATION SYSTEM

(75) Inventors: David R. Shepherd, Durham, NC (US); Mark A. Sibert, Durham, NC (US); David M. Soroka, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2891 days.

(21) Appl. No.: 10/205,993

(22) Filed: Jul. 26, 2002

(65) Prior Publication Data

US 2004/0019626 A1     Jan. 29, 2004

(51) Int. Cl.
*G06F 15/16* (2006.01)
*H04L 29/08* (2006.01)

(52) U.S. Cl.
CPC .............. *H04L 67/14* (2013.01); *H04L 69/329* (2013.01)

(58) Field of Classification Search
CPC ......... G06F 9/44; H04L 67/025; H04L 67/14; H04L 69/329
USPC ................................................. 709/205, 203
See application file for complete search history.

(56) References Cited

U.S. PATENT DOCUMENTS

| | | | |
|---|---|---|---|
| 5,428,525 A | 6/1995 | Cappelaere et al. ........... 364/140 |
| 5,530,852 A * | 6/1996 | Meske et al. ................... 709/206 |
| 5,898,835 A * | 4/1999 | Truong .......................... 709/217 |
| 5,956,483 A * | 9/1999 | Grate et al. .................... 709/203 |
| 6,003,087 A | 12/1999 | Housel, III et al. ........... 709/229 |
| 6,043,815 A * | 3/2000 | Simonoff et al. ............. 715/744 |
| 6,112,246 A | 8/2000 | Horbal et al. ................. 709/230 |
| 6,118,449 A * | 9/2000 | Rosen ................. G06F 3/04812 715/234 |
| 6,119,166 A * | 9/2000 | Bergman ................ H04L 29/06 709/232 |
| 6,182,129 B1 * | 1/2001 | Rowe et al. .................... 709/221 |
| 6,188,401 B1 * | 2/2001 | Peyer ............................ 715/805 |
| 6,289,371 B1 * | 9/2001 | Kumpf et al. ................. 709/203 |
| 6,353,850 B1 * | 3/2002 | Wies et al. .................... 709/203 |
| 6,910,066 B1 * | 6/2005 | Pohl .............................. 709/203 |
| 7,188,305 B1 * | 3/2007 | Corbin et al. ................. 715/205 |

(Continued)

FOREIGN PATENT DOCUMENTS

| | | | |
|---|---|---|---|
| JP | 8-241299 | 9/1996 | ............. G06F 17/00 |
| JP | 2000-259531 | 9/2000 | ............. G06F 13/00 |

OTHER PUBLICATIONS ("Web Publishing in Acrobat/PDF", Chapter 2, Section 2.1, Springer-Verlag Berlin Heidelberg, 1998. pp. 9-23.*

(Continued)

*Primary Examiner* — John Macilwinen
(74) *Attorney, Agent, or Firm* — Cuenot, Forsythe & Kim, LLC

(57) ABSTRACT

A method of activating external application logic from a script embedded in client-side rendered markup. The method can include establishing a communicative link with an application interface to the script. A pre-configured message can be received from the application interface over the communicative link. In response to receiving the pre-configured message, at least one operation can be activated in a process address space which is separate from a process address space used to render the markup and to process the script. Importantly, in a preferred aspect of the present invention, data can be retrieved from a data source remote to the client computing device. Subsequently, the retrieved data can be used to populate at least one user interface field in separately rendered markup.

21 Claims, 2 Drawing Sheets

(56) References Cited

U.S. PATENT DOCUMENTS

| | | | |
|---|---|---|---|
| 7,568,032 B2* | 7/2009 | Feng et al. | 709/226 |
| 2001/0014907 A1* | 8/2001 | Brebner | 709/202 |
| 2002/0107999 A1* | 8/2002 | Zimmermann et al. | 709/330 |
| 2002/0116549 A1* | 8/2002 | Raffaele et al. | 709/330 |
| 2002/0178375 A1* | 11/2002 | Whittaker et al. | 713/200 |
| 2003/0014479 A1* | 1/2003 | Shafron et al. | 709/203 |
| 2003/0051031 A1* | 3/2003 | Streble | 709/224 |

OTHER PUBLICATIONS

J. Marek, "Plain English: Risks of Java Applets and Microsoft ActiveX Controls", Mar. 4, 2002. pp. 1-9.*

U.S. Appl. No. 09/657,217, filed Sep. 7, 2000, Modrak, et al.

U.S. Appl. No. 09/733,737, filed Dec. 8, 2000, Hurd, et al.

Automatic Report Generation by Hypertext Systems, *IBM Technical Disclosure Bulletin*, vol. 38, No. 10, pp. 501-504, (Oct. 1995).

Y. Ueno, et al., Integrating Framework for Application Programs with Network Services Using a Web Browser, *Bulletin of the Electrotechnical Laboratory*, vol. 64, No. 4-5, pp. 87-93, (Apr.-May, 2000).

J. Redlich, et al., IP Services Creation in a Programmable Router, *IEEE Online Library*, IEEE/Popov Workshop on Internet Technologies and Services, (Oct. 27, 1999).

* cited by examiner

CLIENT-SIDE SCRIPT TO APPLICATION COMMUNICATION SYSTEM

BACKGROUND OF THE INVENTION

1. Statement of the Technical Field

The present invention relates to client-side script processing and more particularly to processing embedded scripts in a markup language document.

2. Description of the Related Art

The rise of global computing since the advent of the Internet has spurned substantial growth in the distribution of computing applications. Initially, the distribution of computing applications over the Internet involved only the distribution of static content, typically specified according to one of several markup languages such as the hypertext markup language (HTML). Quickly, however, it became apparent that the continued growth of the Internet would require the distribution of both dynamic and static content.

Nearly one decade ago, the common gateway interface (CGI) enabled the integration of server-side application logic with the distribution of content through the World Wide Web. Specifically, markup language references to application logic could trigger the execution of application logic through the CGI. The application logic itself could include stand-alone executable applications, or PERL scripts which further could include function or complete program calls to stand-alone executable applications.

Most recently, application logic has accompanied static and dynamic content in the form of both client-side scripts and server-side scripts. Client-side scripts include application logic which has been embedded in markup and which can be executed within a client-side content browser. Examples include Javascript and VBScript. Notwithstanding, client-side scripting, while able to add functionality to a Web page, lacks the robust nature of stand-alone executable applications. Though interpretable Java and C# applications can be distributed to client-side content browsers for execution thereon, both client-side scripts and interpretable Java and C# applications are limited to a client-side "sandbox" to protect the integrity of the client-side computing resources. In that regard, client-side scripts and interpretable application logic can be restricted from accessing fundamental computing resources such as fixed storage, audio-visual rendering and the like.

Server-side scripts, by comparison, include computing logic referenced in markup which can be executed within or in association with the content server. Examples include Java Server Pages (JSP) and Active Server Pages (ASP). Still, server-side application logic can be limiting where it is important to interact intimately with client-side computing resources, such as fixed storage and audio-visual rendering. Thus, a long-felt unsolved need exists for robust distributable client-side application logic able to freely access client-side computing resources.

SUMMARY OF THE INVENTION

The present invention addresses the deficiencies of the prior art and provides an interface to robust distributable client-side application logic. In particular, the interface can provide a conduit for scripting logic embedded in client-side markup through which the script can access functionality in external application logic. Significantly, unlike the scripting logic which is limited by the sandbox imposed by the rendering content browser, the external application logic can access computing resources, such as fixed storage, audio-visual rendering and other pages rendered by the content browser. Moreover, as ordinary programming languages are substantially more robust than conventional scripting languages, the external application logic can provide enhanced functionality not readily available from the use of a scripting language alone.

In a client computing device, a method of activating external application logic from a script embedded in client-side rendered markup can include locating the external application logic in the client computing device in response to processing the script embedded in the client-side rendered markup. A communicative link can be established with the located external application logic. Subsequently, at least one operation can be activated in the located external application logic over the communicative link.

Notably, the establishing step can include the step of connecting to the located external application logic on a pre-configured port. The activating step, by comparison, can include both determining a handle to a message handling routine for the located external application logic; and, forwarding a pre-configured message to the located external application logic using the handle. Importantly, in a preferred aspect of the invention, data can be received from the located external application programming logic; and, the received data can be processed in the script. In that regard, the processing step can include populating at least one user interface field with the received data.

In a client computing device, a method of activating external application logic from a script embedded in client-side rendered markup can include establishing a communicative link with an application interface to the script. A pre-configured message can be received from the application interface over the communicative link. In response to receiving the pre-configured message, at least one operation can be activated in a process address space in the client computing device which is separate from a process address space used to render the markup and to process the script. Importantly, in a preferred aspect of the present invention, data can be retrieved from a data source remote to the client computing device. Subsequently, the retrieved data can be used to populate at least one user interface field in separately rendered markup.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a client-side application communications interface disposed between stand-alone client-side application logic and a client-side script embedded in network-distributable, markup-specified content. The communications interface of the present invention can provide a mechanism through which the sandbox-limited client-side script can access unrestricted client-side application logic residing outside the sandbox. In consequence, the client-side application logic can perform client-side computing heretofore unavailable in the client-side script, such as fixed storage access and audio-visual rendering.

Figure 1:
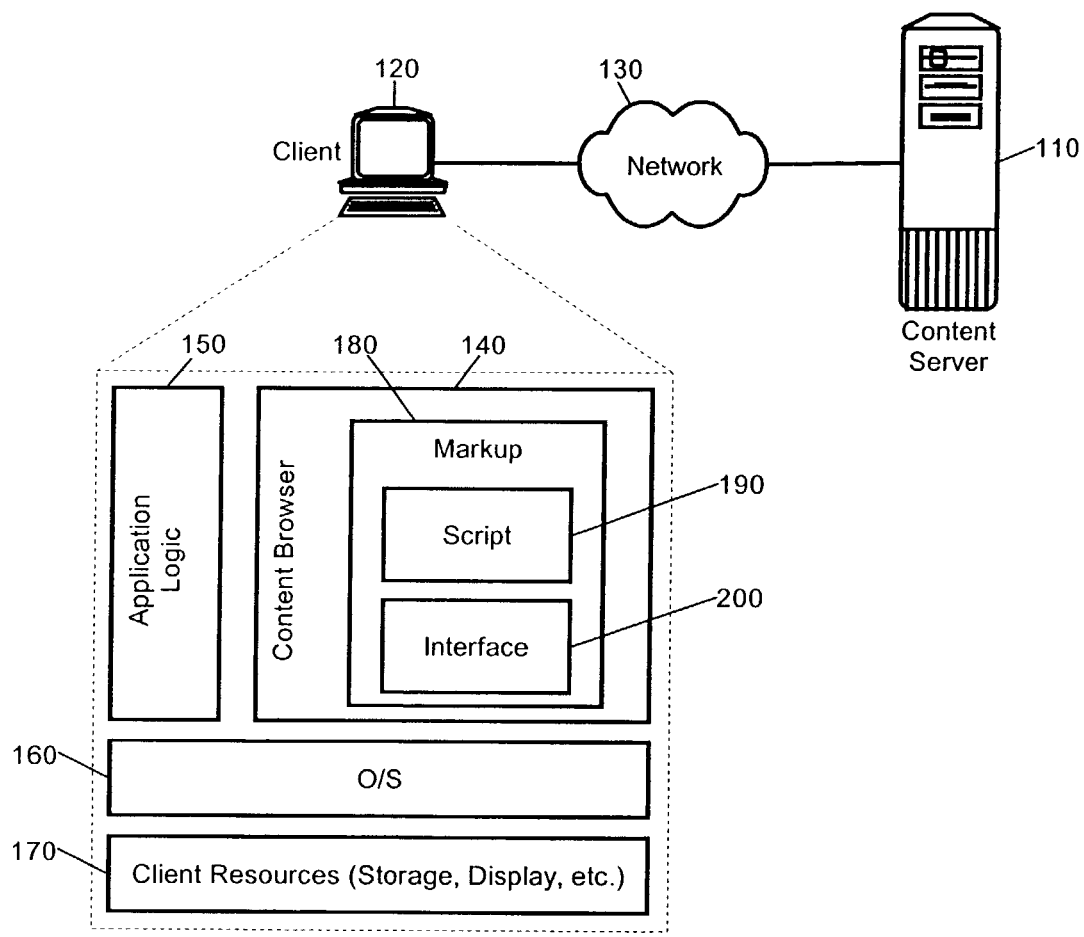
FIG. 1 is a schematic illustration of a content browsing client which has been configured with the communication interface of the present invention; and, FIG. 2 is a flow chart illustrating a process for performing script-initiated client-side application logic through the communication interface of FIG. 1.

FIG. 1 is a schematic illustration of a content browsing client which has been configured with the communication interface of the present invention. As shown in FIG. 1, a communications interface 200 can be disposed in markup 180 in association with an embedded script 190. The markup 180 can be distributed by one or more content servers 110 in a conventional manner over the computer communications network 130. Once received in the client computing device 120, the markup 180 can be rendered within a content browser 140. Notably, as will be recognized by one skilled in the art, the client computing device 120 is not limited strictly to a personal computer and other such computing devices are contemplated herein, such as a personal computer, handheld device, or embedded system.

An operating system 160 can manage the operation of the content browser 140 in a conventional manner and can control program access to client computing resources 170, such as memory, storage, interprocess communications, I/O, and display subsystems. Application logic 150 can further be disposed in the client computing device 120 and can operate concurrently with the content browser 140. As such, the operating system 160 can manage the execution of the application logic 150 in the same manner as the operating system 160 can manage other computer programs executing in the client computing device 120.

Importantly, the application logic 150 can provide enhanced computer processing for use by one or more scripts 190 embedded in the markup 180. In this regard, a functional portion of the script 190 can invoke the robust functionality of the application logic 150 in order to accomplish a computing task which requires access to client computing device resources 170 which otherwise would not be available to the script 190 alone. In order for the functional portion of the script 190 to access the application logic 150, an application communications interface 200 can be disposed in the markup 180.

The interface 200 can be a hidden control, for instance an ActiveX control or a Java Applet, which has been configured to locate and message the application logic 150. For example, the interface 200 can locate the application logic 150 by name by perusing the contents of a window list published by the operation system 160. Once the interface 200 has located the application logic 150, the interface 200 can message the application logic 150, either directly using the message routing and handling facilities of the operating system 160, or through interprocess communications techniques such as TCP/IP, windows messaging or other such operating system interprocess communications technique. In particular, in the case of interprocess communications, the application logic 150 can be pre-configured to monitor a specific port or ports.

In any event, the application logic 150 can undertake pre-configured processing based upon the message provided by the interface 200. In this regard, as the application logic 150 can engage in the pre-configured processing as a stand-alone application, the application logic 150 is not limited in its accessing of client computing resources 170. Moreover, the application logic 150 need not be limited by the reduced functionality of scripting languages used to formulate scripts which can be embedded in network-distributable markup. Thus, the interface 200 can bridge the deficiencies of the script 190 with the application logic 150.

Figure 2:
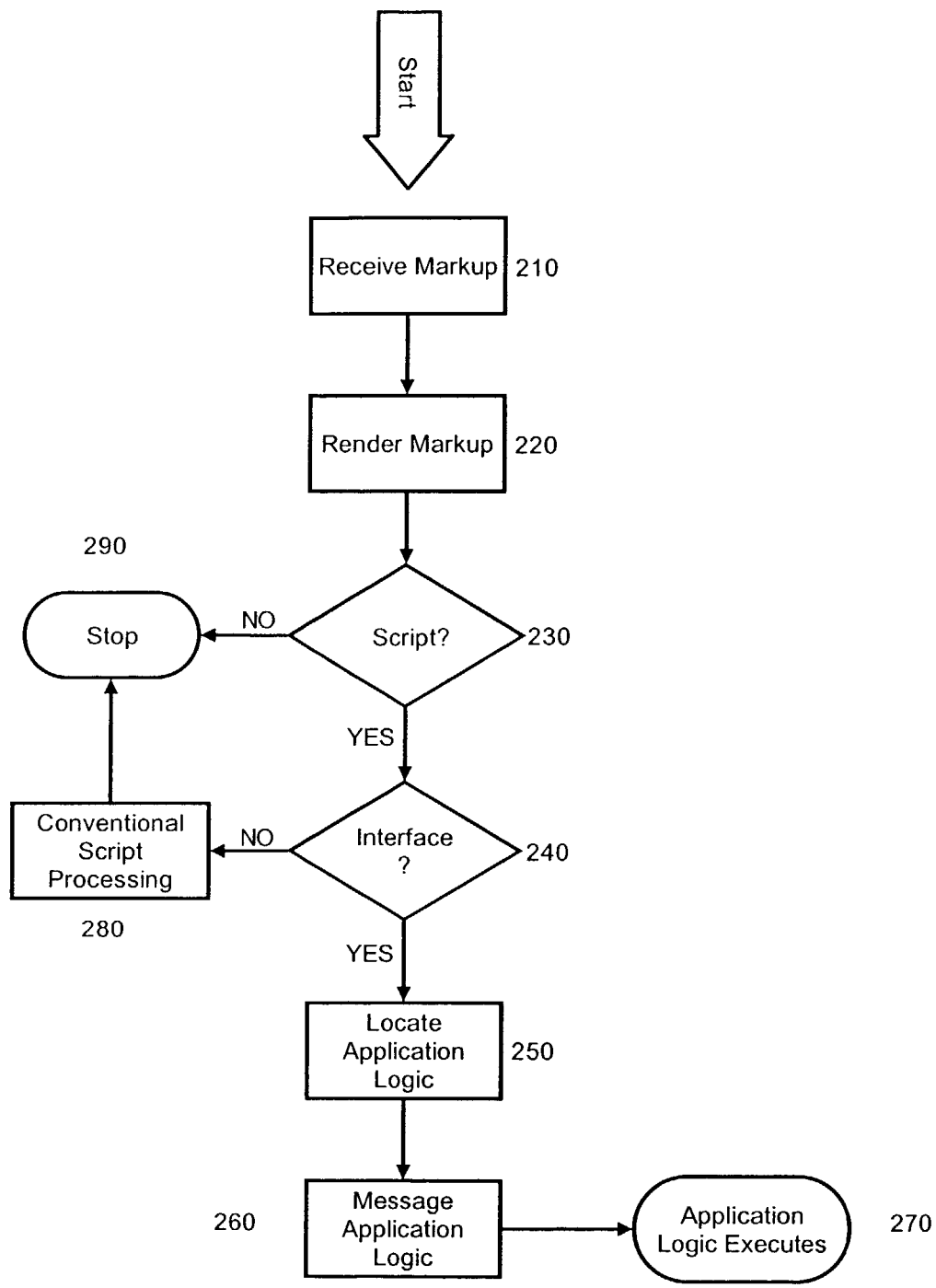

FIG. 2 is a flow chart illustrating a process for performing script-initiated client-side application logic through the communication interface of FIG. 1. Beginning in block 210, markup can be received in a content browser operating in a client computing device. In block 220, the markup can be rendered in a conventional manner in the content browser. In decision block 230, if an embedded script is detected in the markup, in decision block 240 it can be determined whether the script invokes a communications interface to application logic disposed in the client computing device. If not, the script can be processed conventionally, and the process can end in block 290.

Otherwise, if it is determined that the script invokes the communications interface to application logic disposed in the client computing device, in block 250 the interface can locate the application logic. Specifically, the interface can inspect a list of applications executing in the operating system. Alternatively, the interface can inspect a portion of fixed storage in the client computing device. In any case, once the application has been located, in block 260 the interface can forward a message to the located application logic. For instance, the interface can post a unique message directly to the application logic. Alternatively, a TCP/IP connection can be established with the application logic over a pre-specified port using conventional sockets based interprocess communications.

In any event, in block 270, the application logic can execute. During the execution of the application logic, data can be passed back to the script through the interface. Thus, the script can perform additional processing outside of the application logic. For instance, the application logic can be used to retrieve data over a computer communications network for use in a markup language specified form which has been rendered separately from the markup containing the script. As another example, the application logic can be used to populate a user interface element such as a list box with data from an outside data source. As will be recognized by one skilled in the art, the sandbox of a content browser ordinarily will not permit embedded scripting logic to access pages rendered separately from the markup hosting the scripting logic. Thus, the use of the communications interface can bypass the security restrictions imposed by the sandbox.

The present invention can be realized as a computer program in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer-implemented method performed within a client computer, comprising:

receiving, by a browser executing within the client computer, client-side markup including a client-side script and a communication interface separate from the client-side script;

locating, using the communication interface and responsive to the client-side script invoking the communication interface, application logic within the client computer and external to the browser;

establishing, subsequent to the locating and using the communication interface, a communicative link between the client-side script and the application logic;

initiating, using the established communicative link, an operation in the application logic by the communication interface messaging the application logic, wherein the application logic is separate from an operating system managing execution of the application logic.

2. The method of claim 1, wherein
the locating includes the interface inspecting a list of applications executing with the operating system.

3. The method of claim 1, wherein
the locating includes inspecting a portion of a hard drive in the client computer.

4. The method of claim 1, wherein
the communication interface directly messages the application logic.

5. The method of claim 1, wherein
the application logic is preconfigured to monitor a specific port to receive messages from the communication interface.

6. The method of claim 1, wherein the activating includes:
matching, by the application logic, a pre-configured message received from the communication interface with a coded message handling routine; and
performing the operation based upon with the coded message handling routine.

7. The method of claim 1, wherein
data is received by the client-side script and from the application logic; and
the received data is processed by the client-side script.

8. A client computer, comprising:
a hardware processor configured to initiate the operations of:
  receiving, by a browser executing within the client computer, client-side markup including a client-side script and a communication interface separate from the client-side script;
  locating, using the communication interface and responsive to the client-side script invoking the communication interface, application logic within the client computer and external to the browser;
  establishing, subsequent to the locating and using the communication interface, a communicative link between the client-side script and the application logic;
  initiating, using the established communicative link, an operation in the application logic by the communication interface messaging the application logic, wherein
the application logic is separate from an operating system managing execution of the application logic.

9. The system of claim 8, wherein
the locating includes the interface inspecting a list of applications executing with the operating system.

10. The system of claim 8, wherein
the locating includes inspecting a portion of a hard drive in the client computer.

11. The system of claim 8, wherein
the communication interface directly messages the application logic.

12. The system of claim 8, wherein
the application logic is preconfigured to monitor a specific port to receive messages from the communication interface.

13. The system of claim 8, wherein the activating includes:
matching, by the application logic, a pre-configured message received from the communication interface with a coded message handling routine; and
performing the operation based upon with the coded message handling routine.

14. The system of claim 8, wherein
data is received by the client-side script and from the application logic; and
the received data is processed by the client-side script.

15. A machine readable storage device, comprising:
a computer program for activating external application logic stored therein,
the computer program, which when executed by a client computer, causes the client computer to perform:
  receiving, by a browser executing within the client computer, client-side markup including a client-side script and a communication interface separate from the client-side script;
  locating, using the communication interface and responsive to the client-side script invoking the communication interface, application logic within the client computer and external to the browser;
  establishing, subsequent to the locating and using the communication interface, a communicative link between the client-side script and the application logic;
  initiating, using the established communicative link, an operation in the application logic by the communication interface messaging the application logic, wherein
the application logic is separate from an operating system managing execution of the application logic.

16. The machine readable storage device of claim 15, wherein
the locating includes the interface inspecting a list of applications executing with the operating system.

17. The machine readable storage device of claim 15, wherein
the locating includes inspecting a portion of a hard drive in the client computer.

18. The machine readable storage device of claim 15, wherein
the communication interface directly messages the application logic.

19. The machine readable storage device of claim 15, wherein
the application logic is preconfigured to monitor a specific port to receive messages from the communication interface.

20. The machine readable storage device of claim 15, wherein the activating includes:
matching, by the application logic, a pre-configured message received from the communication interface with a coded message handling routine; and
performing the operation based upon with the coded message handling routine.

21. The machine readable storage device of claim 15, wherein
data is received by the client-side script and from the application logic; and
the received data is processed by the client-side script.

* * * * *